(12) United States Patent
Diaz et al.

(10) Patent No.: US 6,675,006 B1
(45) Date of Patent: Jan. 6, 2004

(54) VEHICLE-MOUNTED SYSTEM

(75) Inventors: Melvin Diaz, Lapalma, CA (US); Tsutomu Ogawa, Torrance, CA (US)

(73) Assignee: Alpine Electronics, Inc., Tokyo (JP)

( * ) Notice: Subject to any disclaimer, the term of this patent is extended or adjusted under 35 U.S.C. 154(b) by 0 days.

(21) Appl. No.: 09/579,840

(22) Filed: May 26, 2000

(51) Int. Cl.[7] .............................................. H04M 11/04
(52) U.S. Cl. ................ 455/404.1; 455/90.1; 455/569.2; 455/575.9
(58) Field of Search ......................... 455/404.1, 404.2, 455/550.1, 566, 569.2, 575.9, 90.1

(56) References Cited

U.S. PATENT DOCUMENTS

| | | | |
|---|---|---|---|
| 4,750,197 A | * | 6/1988 | Denekamp et al. .......... 235/375 |
| 4,993,059 A | * | 2/1991 | Smith et al. .................... 379/39 |
| 5,081,667 A | * | 1/1992 | Drori et al. ................ 290/38 C |
| 5,223,844 A | * | 6/1993 | Mansell et al. .......... 340/825.49 |
| 5,357,560 A | * | 10/1994 | Nykerk ........................ 340/426 |
| 5,673,305 A | | 9/1997 | Ross |
| 5,705,980 A | * | 1/1998 | Shapiro ....................... 340/539 |
| 5,805,055 A | * | 9/1998 | Colizza ....................... 180/287 |
| 6,044,257 A | * | 3/2000 | Boling et al. ................ 455/404 |
| 6,127,933 A | * | 10/2000 | Ohmura et al. ............. 340/636 |
| 6,198,914 B1 | * | 3/2001 | Saegusa ...................... 455/404 |
| 6,243,645 B1 | * | 6/2001 | Moteki et al. .............. 340/988 |
| 6,324,393 B1 | * | 11/2001 | Doshay ....................... 340/436 |

FOREIGN PATENT DOCUMENTS

| | | | | |
|---|---|---|---|---|
| IT | GB2256771 | * | 12/1992 | .......... H04M/11/00 |

* cited by examiner

*Primary Examiner*—William Trost
*Assistant Examiner*—Stephen D'Agosta
(74) *Attorney, Agent, or Firm*—Brinks Hofer Gilson & Lione (57) ABSTRACT

A vehicle-mounted system comprising a security device and an emergency communication service unit has the following features. (1) An LED capable of emitting light in two colors is provided in the security device. (2) The security device and the emergency communication service unit are connected in communication with one another. (3) When a connection to a response center is completely established upon operation of a communication switch, the emergency communication service unit requests the security device to turn on an LED to emit light in a first color (green). (4) When a connection to the response center is completely established upon operation of a panic switch, the emergency communication service unit requests the security device to turn on the LED to emit light in a second color (red). (5) The security device controls the LED to emit light in the requested color.

24 Claims, 6 Drawing Sheets

VEHICLE-MOUNTED SYSTEM

BACKGROUND OF THE INVENTION

1. Field of the Invention

The present invention relates to a vehicle-mounted system, and more particularly to a vehicle-mounted system comprising a security device for detecting an abnormal condition for a vehicle and generating an alarm, and an emergency communication service unit (MayDay Unit) including a mobile telephone that informs a response center of the occurrence of an emergency in the event of emergency, the device and unit being connected in communication with one another.

2. Description of the Related Art

Vandalism of vehicles and cases of vehicle theft have increased with a deterioration in public security, and car security devices have become increasingly used as a means for protecting vehicles against those acts. With a car security device mounted in a vehicle, when the driver depresses an arming key of a remote control after getting out of the vehicle and closing a door, the remote control transmits an arming command code. The security device receives the arming command code and starts the arming operation (security operation) in response to the command. During the arming mode, the security device monitors outputs of various sensors such as a door sensor, a radar sensor, a hood (bonnet) sensor and a trunk sensor, and generates predetermined alarms upon actuation of the sensors. For example, if the door sensor detects opening of the door during the arming mode, the security device sounds a siren by itself, or controls the head lamps to flash on and off, or prevents the startup of an engine (cuts off a starter), thereby protecting the vehicle from theft.

Also, recent years have seen widespread use of an emergency communication service system that establishes a connection between a vehicle and a particular place (response center) via a mobile telephone network in the event of emergency, and enables the driver to receive various services from the response center. Such a service system is called a MayDay System or Telematics System in the United States.

Figure 7:
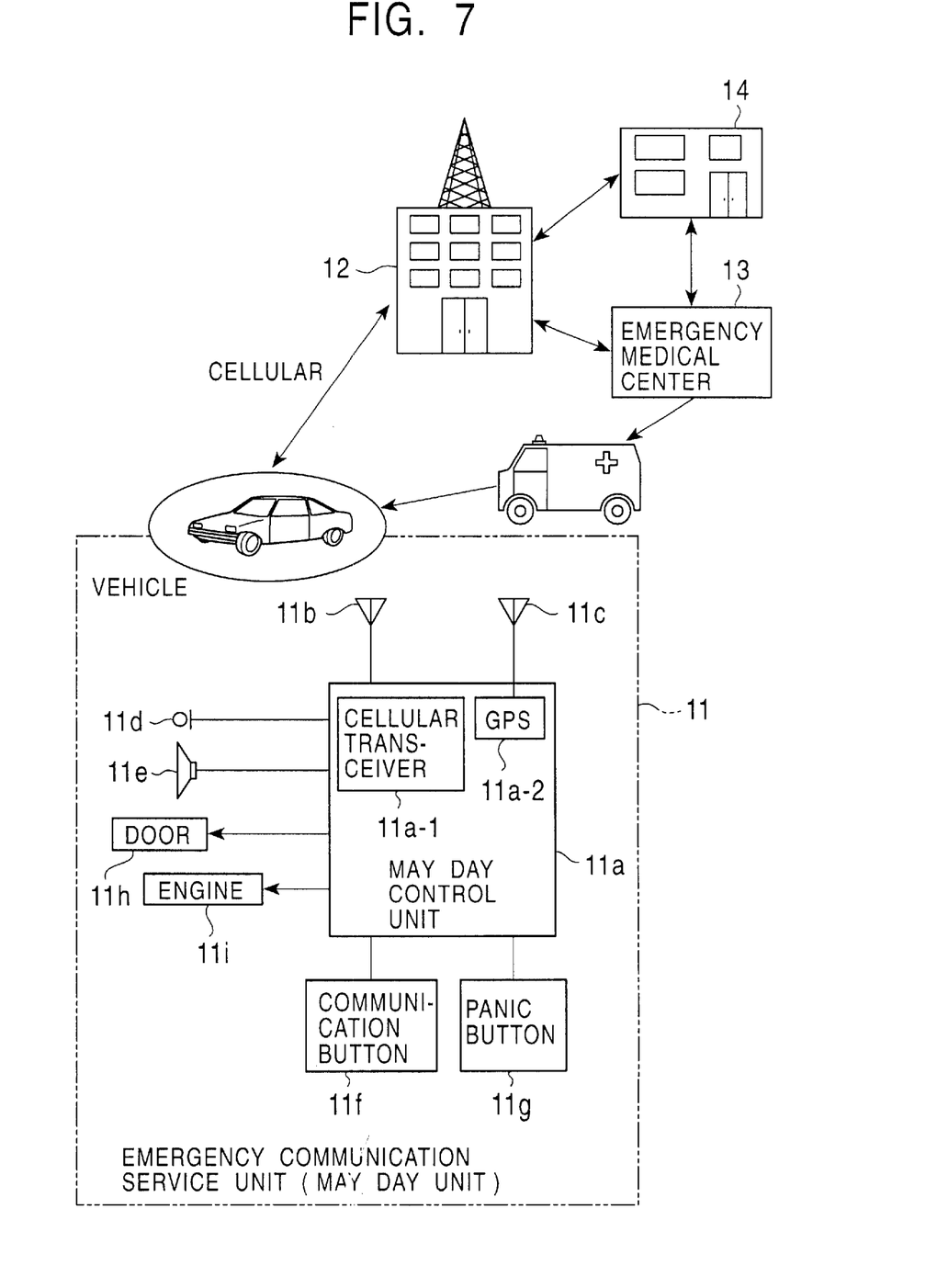
FIG. 7 is a block diagram of a conventional MayDay System.

FIG. 7 is a block diagram of the MayDay System. Numeral 11 denotes an emergency communication service unit (MayDay Unit) mounted in a vehicle, and 12 denotes a response center responding to a request from the emergency communication service unit (MayDay Unit). Numeral 13 denotes an emergency medical center sending an ambulance in accordance with an instruction from the response center, and 14 denotes a roadside assistance center responding to troubles such as a tire puncture and running out of gas. In the emergency communication service unit (MayDay Unit) 11, 11a denotes a MayDay control unit comprising a cellular transceiver 11a-1, a GPS receiver/demodulator 11a-2 for measuring a vehicle position, an acoustic circuit, a microcomputer for control processing, and so on. The MayDay Unit 11 further includes a cellular antenna (car phone antenna) 11b, a GPS antenna 11c, a hands free microphone 11d, an external speaker 11e, a communication button 11f operated when making a call to the response center, a panic button 11g for informing the response center of the occurrence of an emergency in the event of emergency, a door automatic locking/unlocking unit 11h, and an engine disabling unit 11i. The cellular transceiver 11a-1, the cellular antenna 11b, the hands free microphone 11d, and the external speaker 11e together constitute a mobile telephone.

Examples of services provided by the MayDay System are as follows;
(1) communicating the occurrence of an accident or emergency,
(2) remote door unlocking of a vehicle locked without a key at hand,
(3) roadside assistance,
(4) engine disable,
(5) navigation assistance, and
(6) search for a stolen car.

In the service (1), communicating the occurrence of an accident or emergency, the user operates the panic button 11g to call the response center 12 with the mobile telephone, thereby informing the response center of the occurrence of an accident or emergency. The response center 12 transfers the received notice to the emergency medical center 13 and a police station so as to take immediate action for medical treatment and accident management. In the service (2), remote door unlocking of a vehicle locked without a key at hand, the user uses an external telephone to call the response center 12 in order to unlock the car doors when the keys are inside the locked car. Then, the response center 12 transmits an unlocking command to the MayDay control unit 11a, thereby automatically unlocking the locked vehicle. In the service (3), roadside assistance, upon a vehicle suffering a tire puncture or running out of gas, the user operates the communication button 11f to call the response center 12 with the mobile telephone, and informs the response center orally of the need for help from the response center 12. The response center 12 transfers the received notice to the roadside assistance center 14 so as to take an action for sending a relief team. In the service (4), engine disable, if a vehicle should be stolen, the user informs the response center 12 of the theft from an external telephone. The response center 12 transmits an ignition cut command to the MayDay control unit 11a, thereby disabling the engine. In the service (5), navigation assistance, an operator at the response center 12 guides a route to the destination by voice. In the service (6), search for a stolen car, if a vehicle should be stolen, the user informs the response center 12 of the fact from an external telephone. The response center 12 transmits a vehicle position request command to the MayDay control unit 11a to acquire the vehicle position from the MayDay control unit 11a, and advises the user of the vehicle position.

Generally speaking, with the MayDay System, the user can receive various services by operating the communication button 11f or the panic button 11g, which are installed in the vehicle, so that the MayDay Unit 11 is connected to the response center 12, or by communicating with the response center using an external telephone. Even with the communication button 11f or the panic button 11g operated, however, a connection to the response center 12 sometimes cannot be immediately established because of network congestion or some other reason. In such a case, since the conventional MayDay Unit 11 has no display unit, a problem arises in that the user cannot easily confirm whether a connection to the response center 12 has been completely established, or whether an established communication line has been cut off. Especially when the user has operated the panic button in the event of emergency, a sense of unease is increased if the user cannot recognize whether the occurrence of a panic state has been definitely communicated to the response center.

Further, the security device can repel a thief, and the MayDay System can take an action to search for a stolen car or prevent the startup of an engine. Another problem, however, is that a conventional security device cannot collect sufficient evidence to prove who is a thief, and hence is not sufficient from the viewpoint of a lawsuit.

SUMMARY OF THE INVENTION

Therefore, a first object of the present invention is to enable the user to confirm whether a connection to the response center 12 has been completely established upon operation of the communication button 11f or the panic button 11g of the MayDay System, and whether an established communication line has been cut off.

A second object of the present invention is to enable a security device to collect sufficient evidence to prove who is a thief.

According to the present invention, the above first object is achieved by a vehicle-mounted system having the following features: (1) an LED capable of emitting light in two colors is provided in a security device, (2) the security device and an emergency communication service unit are connected in communication with one another, (3) when a connection to a response center is completely established upon operation of a communication switch, the emergency communication service unit requests the security device to turn on the LED to emit light in a first color (green), (4) when a connection to the response center is completely established upon operation of a panic switch, the emergency communication service unit requests the security device to turn on the LED to emit light in a second color (red), and (5) the security device controls the LED to emit light in the requested color.

According to the present invention, the above second object is achieved by a vehicle-mounted system having the following features: (1) the vehicle-mounted system includes a recording unit, such as a concealed camera, for recording an image of the interior of the vehicle in response to an instruction from a security device, (2) the security device instructs the recording unit to record an image of the interior of the vehicle upon detection of an abnormality and communicates the occurrence of the abnormality to an emergency communication service unit, and (3) the emergency communication service unit connects a mobile telephone to a response center in accordance with the notice communicated from the security device, and transmits the image recorded by the recording unit to the response center.

Other features and advantages of the present invention will be apparent from the following description taken in conjunction with the accompanying drawings.

DESCRIPTION OF THE PREFERRED EMBODIMENTS (A) First Embodiment

Figure 1:
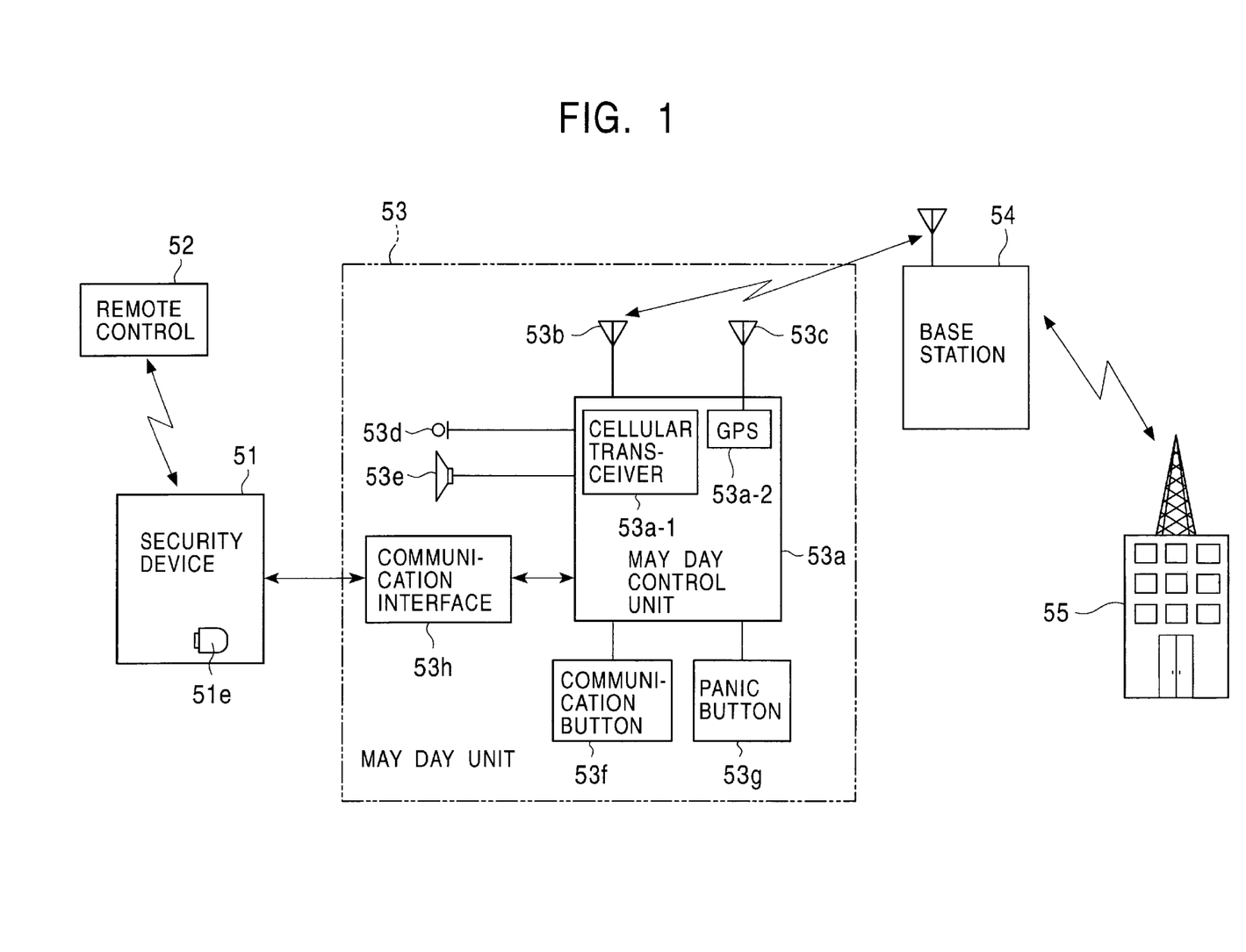
FIG. 1 is a block diagram of a first embodiment of a vehicle-mounted system according to the present invention.

FIG. 1 is a block diagram of a first embodiment of a vehicle-mounted system according to the present invention. In FIG. 1, numeral 51 denotes a security device for detecting an abnormal condition for a vehicle and generating an alarm, and 52 denotes a remote control for instructing the security device to come into the arming/disarming mode. Numeral 53 denotes an emergency communication service unit (MayDay Unit), 54 denotes a base station of a mobile telephone network, and 55 denotes a response center.

Figure 2:
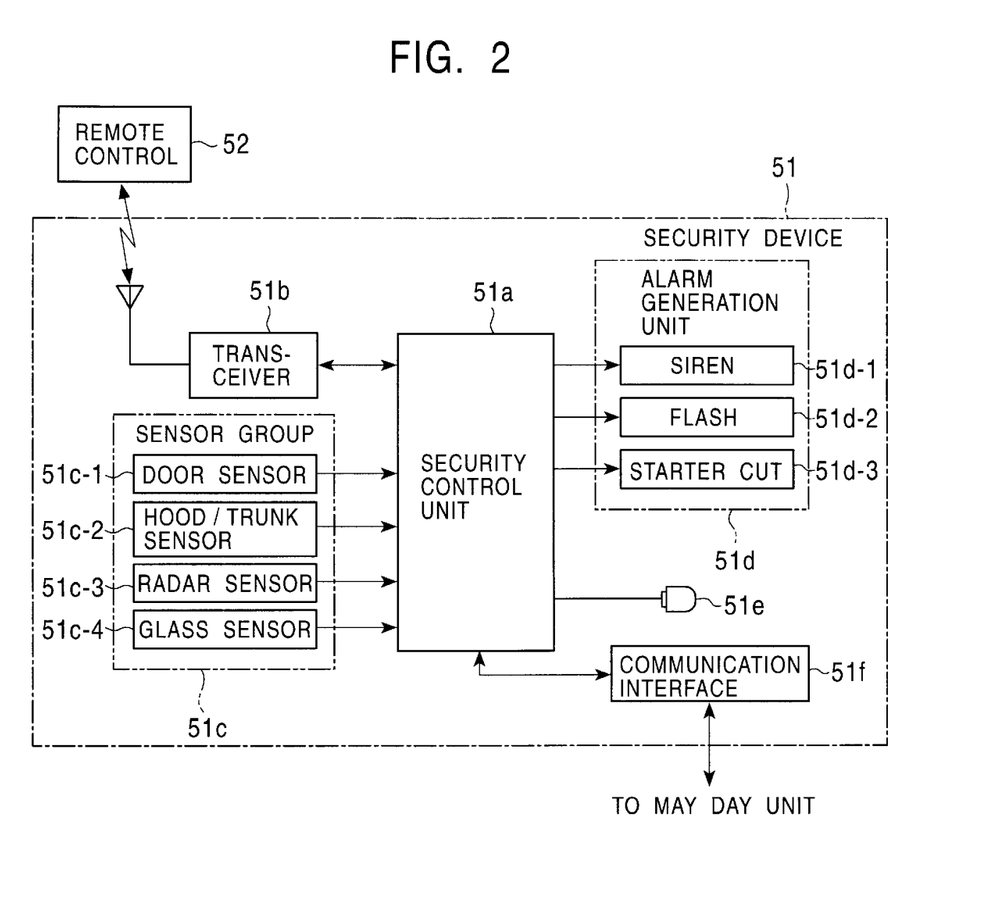
FIG. 2 is a block diagram of a security device.

As shown in FIG. 2, the security device 51 includes a security control unit 51a comprising a microcomputer, a transceiver 51b, a sensor group 51c for detecting an abnormal condition for the vehicle, an alarm generating unit 51d for generating various alarms upon detection of any abnormality, an LED 51e capable of emitting light in two colors, and a communication interface 51f, such as RS232C, for communicating with the MayDay Unit 53. The security control unit 51 a performs, for example, (1) control of startup/stop (arming/disarming) of the security device in accordance with a command issued from the remote control 52, (2) control of alarm generation in the event of an abnormal condition, and (3) control of LED light emission. The transceiver 51b is designed so as to (1) receive and demodulate data sent from the remote control 52 through high-frequency amplification, frequency conversion, digital demodulation, etc., and (2) digitally modulate a carrier wave by a predetermined modulation method, e.g., FSK modulation, in accordance with data inputted from the security control unit 51a, and then transmit the modulated data to the remote control 52 after performing frequency conversion and power amplification. Although the remote control 52 is described with two-way communication capability, this is not required for the present invention. A remote control with one-way communication capability can also be used.

The sensor group 51c is provided to detect an abnormal condition for the vehicle. The sensor group 51c includes a door sensor 51c-1 for detecting the open or closed state of a door, a hood/trunk sensor 52c-2 for detecting the open or closed state of a hood/trunk, a radar sensor 51c-3 for detecting the event that a thief has broken into the vehicle, and a glass sensor 51c-4 for detecting breakage of glass. The types of sensors are not limited to those illustrated, and any other suitable sensors, including a motion sensor, can also be provided.

The alarm generating unit 51d generates various alarms upon detection of any abnormality. The alarm generating unit 51d includes a siren driving circuit 51d-1 for sounding a siren, a headlight flashing circuit (flash) 52d-2 for causing head lamps to flash on and off, and a starter cutter 51d-3 for preventing the startup of an engine.

Figure 3:
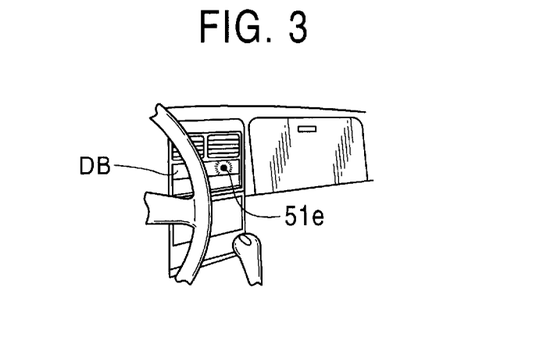
FIG. 3 is an explanatory view showing a position at which an LED device is arranged.

The LED 51e is disposed on a dashboard DB, as shown in FIG. 3, to display (1) the state of the security device and (2) the state of connection between the emergency communication service unit (MayDay Unit) 53 and the response center 55. More specifically, the LED 51e is energized to (1) flash in a first color (green) when the security device is brought into the arming mode, and (2) flash in the first color (green) at the number of times corresponding to the number of sensors which have been actuated during the arming mode, when the security device is brought back to the disarming mode. Also, the LED 51e is energized to (3) continuously emit light in the first color (green) during a period in which a connection between the emergency communication service unit 53 and the response center 55 is established upon operation of a communication button (described later), until the connection is cut off, and (4) continuously emit light in a second color (red) during a period in which a connection between the emergency communication service unit 53 and the response center 55 is established upon operation of a panic button (described later), until the connection is cut off.

Returning to FIG. 1, the emergency communication service unit (MayDay Unit) 53 includes a MayDay control unit (main unit) 53*a*, a cellular antenna (car phone antenna) 53*b*, a GPS antenna 53*c*, a hands free microphone 53*d*, an external speaker 53*e*, a communication button 53*f*, a panic button 53*g*, and a communication interface 53*h* (such as RS232C) for communicating with the security device. The MayDay control unit 53*a* comprises a cellular transceiver 53*a*-1, a GPS receiver/demodulator 53*a*-2 for measuring a vehicle position, an acoustic circuit (not shown), a microcomputer for control processing, and so on. The MayDay control unit (main unit) 53*a* is preferably disposed in a secret location such that the installed unit cannot be easily located by a thief. The MayDay Unit also includes a modem for data communication for activating services such as door unlocking, searching for a stolen vehicle, etc.

The communication button 53*f* is operated when making a call to the response center 55, and is preferably disposed in such a position as to allow the user to easily operate the button even while driving. The panic button 11*g* is provided for communicating the occurrence of an emergency to the response center 55 in the event of emergency, and is preferably disposed in a position that is concealed, but still allows the user to readily operate the button. Note that the communication button and the panic button may be each replaced by a key or a toggle switch.

Figure 4:
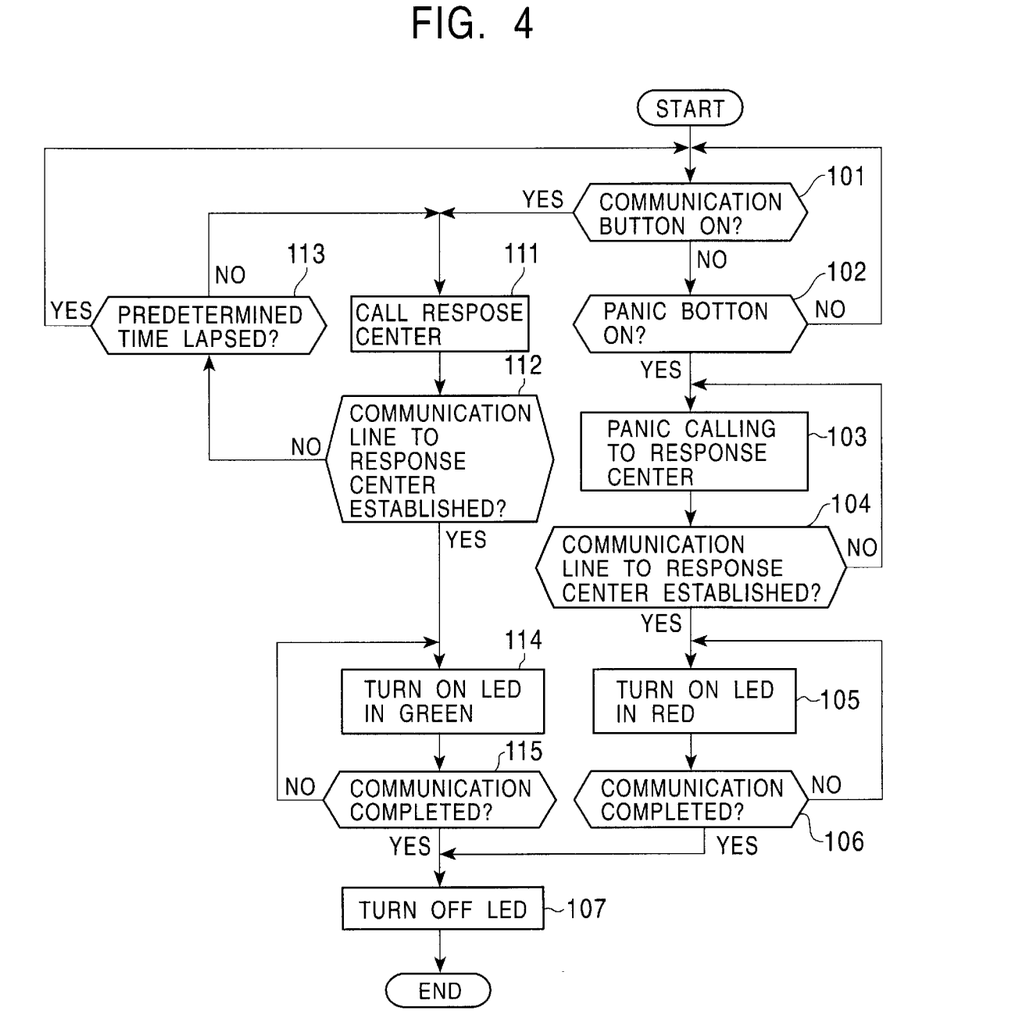
FIG. 4 is a flowchart for explaining light emission control of the LED device.

FIG. 4 is a flowchart for explaining light emission control of the LED 51*e*.

The MayDay control unit 53*a* checks whether the communication button 53*f* has been turned on (Step 101), and if not, it checks whether the panic button 53*g* has been turned on (Step 102). The MayDay control unit 53*a* continues monitoring both the buttons 53*f*, 53*g* until either of the buttons is turned on.

If the panic button 53*g* is turned on, the MayDay control unit 53*a* controls the cellular transceiver 53*a*-1 to issue a call to the response center 55 (panic calling, Step 103). Then, the MayDay control unit 53*a* checks whether a communication line to the response center 55 has been established with the issued call and the occurrence of a panic state has been communicated to the response center (Step 104). If a communication line to the response center 55 is not established, the calling is continued until the communication line is established.

If the communication line is established under control of the base station 54, the MayDay control unit 53*a* requests the security device 51 to turn on the LED 51*e* in red (Step 105). In response to the request, the security control unit 51*a* (FIG. 2) controls the LED 51*e* to emit light in red.

Subsequently, it is checked whether the communication has been completed and the communication line has been cut off (Step 106). If the communication line is not cut off, the LED 51*e* continues to emit light in red. If the communication line is cut off, for example, if the panic button is depressed, or if on-hook operation is made in the response center and the communication line is cut off at the base station, the MayDay control unit 53*a* requests the security device 51 to perform control for turning off the LED 51*e* (Step 107). In response to the request, the security control unit 51*a* (FIG. 2) turns off the LED 51*e*.

On the other hand, if the communication button 53*f* is turned on in Step 101, the MayDay control unit 53*a* controls the cellular transceiver 53*a*-1 to issue a call to the response center 55 (general calling, Step 111). Then, the MayDay control unit 53*a* checks whether a communication line to the response center 55 has been established with the issued call (Step 112). If a communication line to the response center 55 is not established, whether a predetermined time has lapsed is checked (Step 113). If the predetermined time has not lapsed, the calling is continued. If no communication line is established after the lapse of the predetermined time, the MayDay control unit 53*a* stops the calling and returns to Step 101. Alternatively, the calling may be continued until the communication line is established.

If the communication line is established under control of the base station 54 before the lapse of the predetermined time, the MayDay control unit 53*a* requests the security device 51 to turn on the LED 51*e* in green (Step 114). In response to the request, the security control unit 51*a* (FIG. 2) controls the LED 51*e* to emit light in green. Subsequently, it is checked whether the communication has been completed and the communication line has been cut off (Step 115). If the communication line is not cut off, the LED 51*e* continues to emit light in green. If the communication line is cut off, for example, if the communication button is depressed, or if on-hook operation is made in the response center and the communication line is cut off at the base station, the MayDay control unit 53*a* requests the security device 51 to turn off the LED 51*e* (Step 107). In response to the request, the security control unit 51*a* (FIG. 2) turns off the LED 51*e*.

With the first embodiment described above, the user can easily confirm (1) whether a connection between the MayDay System and the response center has been completely established, and (2) whether an established communication line has been cut off, by using an LED originally provided in the security device without additionally providing an LED in the MayDay System. Also, since an LED device capable of emitting light in two colors is employed as the LED, it is possible to discriminate whether the communication line has been established by depressing the communication button or the panic button.

(B) Second Embodiment

Figure 5:
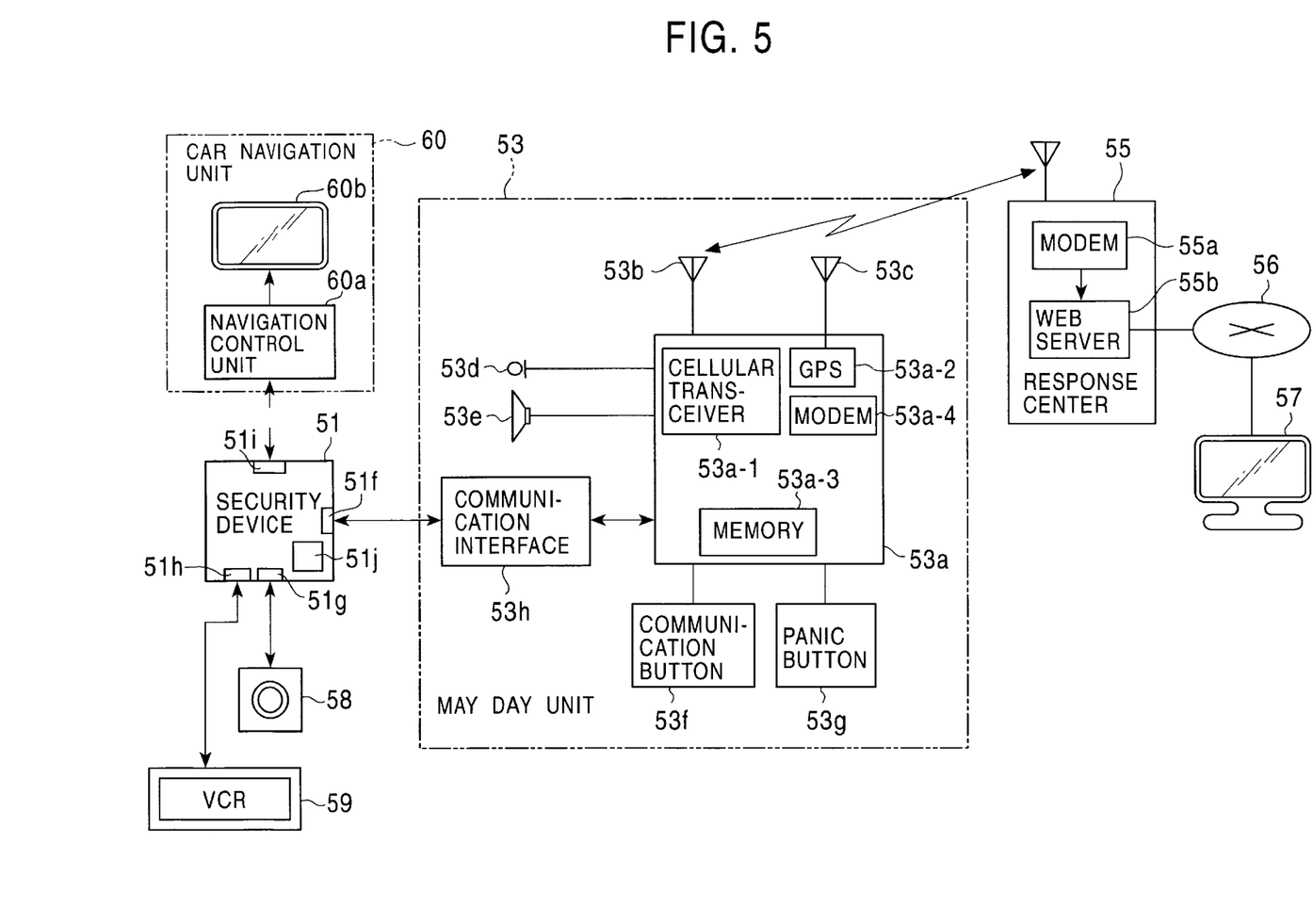
FIG. 5 is a block diagram of a second embodiment of the vehicle-mounted system according to the present invention.

FIG. 5 is a block diagram of a second embodiment of the vehicle-mounted system according to the present invention. In FIG. 5, the same components are denoted by the same numerals. Referring to FIG. 5, numeral 51 denotes a security device for detecting an abnormal condition for a vehicle and generating an alarm. In addition to the components shown in FIG. 2, the security device 51 includes communication interfaces 51*f* to 51*i* for communicating with external devices such as a concealed camera, a video cassette recorder (VCR) including a concealed video camera, and a car navigation unit, as well as an image memory 51*j*.

Numeral 53 denotes a MayDay Unit having substantially the same configuration as in FIG. 1. The MayDay Unit 53 differs from the corresponding one in FIG. 1 in that the MayDay Unit 53 further comprises, in addition to the components shown in FIG. 2, an image memory 53*a*-3 for storing images and a modem 53*a*-4 for transmitting images to a response center 55 via a cellular transceiver 53*a*-1.

Numeral 55 denotes a response center 55, 56 denotes the Internet, and 57 denotes a home base station owned by the user. The response center 55 includes a modem 55*a*, a WEB server 55*b*, and a number of base stations (not shown) connected to the WEB server 55*b* via a LAN. The WEB server 55*b* has the functions of (1) storing images transmitted from the MayDay Unit 53 for each user, (2) downloading the stored image in response to a request from any base station and displaying the downloaded image on a screen of the base station, and (3) transmitting the stored image in response to a request from the user's home base station 57 via the Internet 56.

Numeral 58 denotes a concealed camera for recording an image of the interior of a vehicle. The concealed camera 58 must be disposed in such a position as to not be easily located by a thief. When the security device 51 instructs recording upon invasion of a thief into the vehicle, the concealed camera 58 takes plural photos of the interior of the vehicle (i.e., the thief), and photo images are stored in the image memory 51j of the security device. Numeral 59 denotes a video cassette recorder (VCR) which must also be disposed in such a position as to not be easily located by a thief. When the security device 51 instructs recording upon invasion of a thief into the vehicle, the video cassette recorder 59 starts shooting or video recording of the interior of the vehicle continuously. Although the concealed camera 58 and the video cassette recorder 59 are connected to the security device 51 in this embodiment, they may be connected to the MayDay Unit 53. Also, only one of those recording means may be provided instead of providing both of them.

Numeral 60 denotes a car navigation unit connected to the security device 51. The navigation unit 60 comprises a navigation control unit 60a and a display unit 60b for navigation. When the navigation unit 60 is operated, the security device 51 starts up the operation of the video cassette recorder 59 and transmits a reproduced video image to the navigation unit so that the video image is displayed on the navigation display unit 60b.

Figure 6:
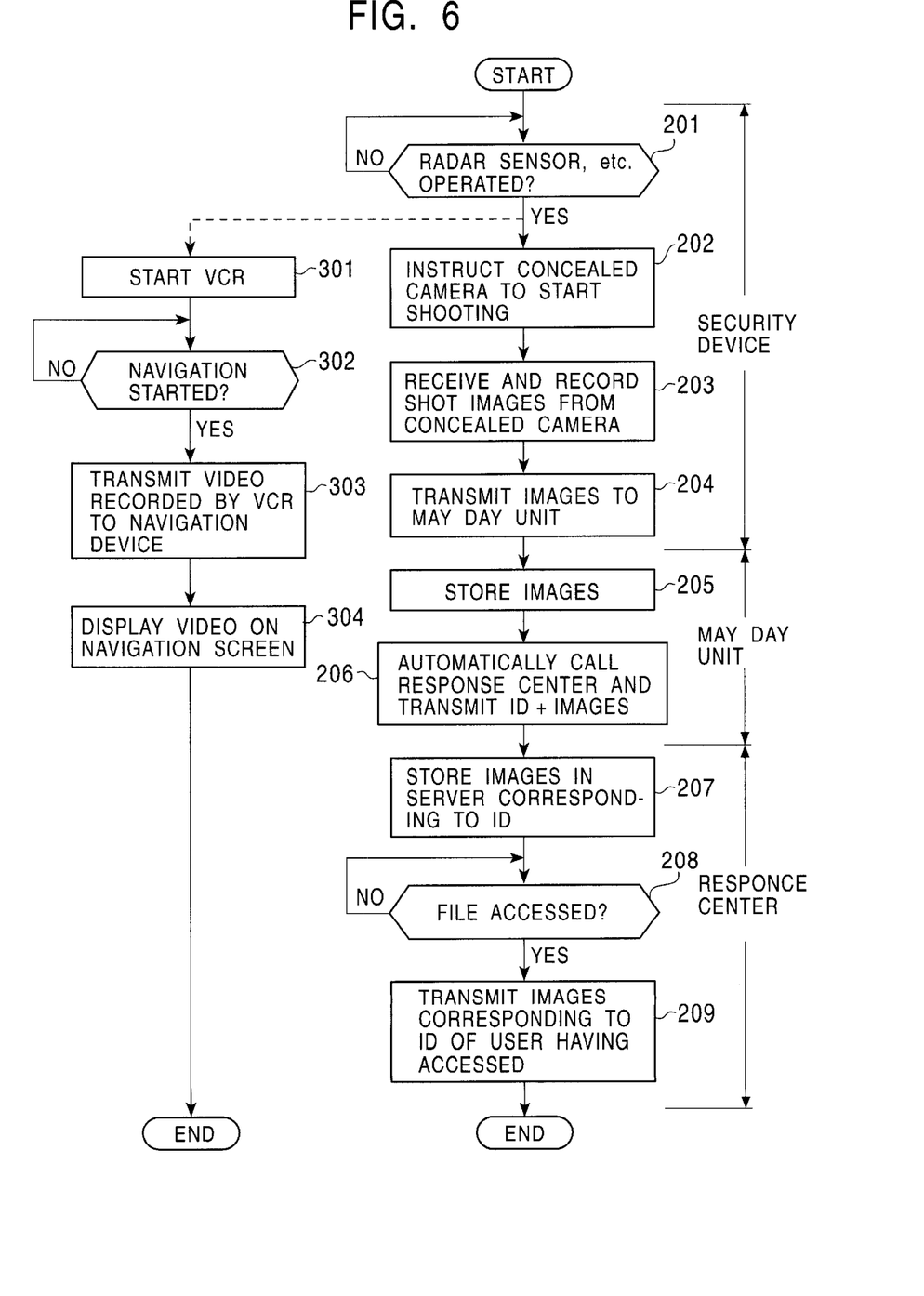
FIG. 6 is a flowchart of the processing to record and display an image of the interior of a vehicle in the event that a thief has broken into the vehicle.

FIG. 6 is a flowchart of the processing to record and display an image of the interior of a vehicle in the event that a thief has broken into the vehicle.

The security control unit 51a (see FIG. 2) checks whether the radar sensor, etc. have been actuated, i.e., whether a thief has broken into the vehicle (Step 201). If a plurality of sensors including the radar sensor are actuated, this is regarded as indicating that a thief has broken into the vehicle, whereupon the security control unit 51a transmits a recording-enable signal to the concealed camera 58 and instructs the same to start shooting (Step 202). The concealed camera 58 takes photos of the interior of the vehicle at intervals of a predetermined time in response to the recording instruction, and transmits photo images to the security device 51. The security device 51 stores the images of the interior of the vehicle in the image memory 51j built therein (Step 203). Then, the security device 51 communicates the occurrence of an abnormal condition to the MayDay Unit 53, and also transmits the images of the interior of the vehicle (Step 204).

The MayDay control unit 53a of the MayDay Unit 53 stores the images of the interior of the vehicle in the image memory 53a-3 (Step 205). Simultaneously, the MayDay control unit 53a calls the response center 55 and transmits a set of a user ID and the images of the interior of the vehicle to the response center 55 via the modem 53a-4, the cellular transceiver 53a-1 and the cellular antenna 63b in this order (step 206).

The WEB server 55b of the response center 55 stores the received images, as a file, in a memory within the server in corresponding relation to the user ID (Step 207). The WEB server 55b checks whether there is an access to the stored file (Step 208). If the file is accessed, the WEB server 55b downloads the images of the interior of the vehicle corresponding to the user ID presented for the access (Step 209).

The above processing is carried out in the case of the concealed camera 58 being provided as the recording means. Where the video cassette recorder (VCR) 59 is provided as the recording means, the processing proceeds as follows. If Step 201 detects the event that a thief has broken into the vehicle, the security device 51 instructs the video cassette recorder (VCR) 59 to start video recording (Step 301). In response to the instruction, the video cassette recorder 59 starts to continuously record a video image of the interior of the vehicle.

If the user boards the vehicle and starts up the navigation unit 60 after the lapse of a certain time from the completion of video recording (Step 302), the security device 51 instructs the video cassette recorder 59 to reproduce the recorded video image and transmits the reproduced video image, which is inputted from the video cassette recorder, to the navigation control unit 60a (Step 303). The navigation control unit 60a inputs the received reproduced video image to the navigation display unit 60b to display it on the screen (Step 304). As an alternative, static images recorded by the concealed camera 58 can also be displayed on the navigation display unit 60b by starting up the navigation unit 60.

With the second embodiment described above, in the event that a thief has broken into a vehicle, a face of the thief in the vehicle is secretly recorded. Therefore, positive evidence sufficient to prove who is the thief can be collected, and this evidence is advantageous from the viewpoint of a lawsuit.

According to the present invention, as described above, the user can easily confirm (1) whether a connection between a MayDay System and a response center has been completely established, and (2) whether an established communication line has been cut off, by using an LED originally provided in a security device without additionally providing an LED in the MayDay System. Also, since an LED device capable of emitting light in two colors is employed as the LED, it is possible to discriminate whether the communication line has been established by depressing a communication button or a panic button.

Further, according to the present invention, since the face of a thief having broken into a vehicle is recorded, definite evidence in proving a crime can be collected. As many apparently widely different embodiments of the present invention can be made without departing from the spirit and scope thereof, it is to be understood that the invention is not limited to the specific embodiments thereof except as defined in the appended claims.

What is claimed is:

1. A vehicle-mounted system, comprising:
    a security device including at least one sensor for detecting an abnormal condition for the vehicle in an arming mode and an alarm generating unit;
    an emergency communication service unit, including at least one switch operated to communicate with a response center, wherein said at least one switch includes a communication switch operated when communicating with said response center and a panic switch operated for communicating the occurrence of an emergency to said response center in the event of emergency; and
    a visual indicator in the form of a single light that is turned on when a connection to said response center is established upon operation of said at least one switch, wherein the visual indicator includes at least two visual states, with a first state being turned on when a voice connection to said response center is established upon operation of the communication switch and turned off when the connection is terminated, said first visual state being maintained for the time that the voice connection is established and a second state being turned on when a connection to said response center is established upon operation of the panic switch;

wherein said visual indicator also indicates a state of said security device, the security system includes a first control unit for controlling the generation of an alarm upon detection of an abnormal condition for the vehicle and controlling the visual indicator, and the emergency communication service unit includes a second control unit for requesting the first control unit to turn on the visual indicator when a connection to said response center is established upon operation of said at least one switch: and wherein said visual indicator is an LED capable of emitting light in two colors, and said at least one switch includes a communication switch operated when communicating with said response center and a panic switch operated for communicating the occurrence of an emergency to said response center in the event of emergency, the second control unit being operable to request the first control unit to turn on said LED to emit light in a first color when a connection to said response center is established upon operation of the communication switch, and to request the first control unit to turn on said LED to emit light in a second color when a connection to said response center is established upon operation of the panic switch.

2. A vehicle-mounted system according to claim 1, wherein said first color is green and said second color is red.

3. A vehicle-mounted system according to claim 1, further comprising recording means for recording an image of the interior of the vehicle in response to an instruction from said security device; wherein said security device instructs said recording means to record an image of the interior of the vehicle upon detection of an abnormal condition and communicates the occurrence of the abnormal condition to said emergency communication service unit; and said emergency communication service unit connects a mobile telephone to said response center in accordance with the notice communicated from said security device, and transmits the image recorded by said recording means to said response center.

4. A vehicle-mounted system according to claim 3, wherein said emergency communication service unit adds a user ID to the image transmitted to said response center.

5. A vehicle-mounted system according to claim 3, wherein said recording means is a concealed camera mounted on the vehicle and producing a static image.

6. A vehicle-mounted system according to claim 3, wherein said recording means is a concealed video camera producing a continuous image.

7. A vehicle-mounted system according to claim 3, further comprising a navigation unit, wherein when said navigation unit is operated, the image recorded by said recording means is displayed on a screen of said navigation unit.

8. A vehicle-mounted system according to claim 1, further comprising:

a security device for detecting an abnormal condition for a vehicle in an arming mode;

wherein said security device includes means for recording an image of the interior of the vehicle when an abnormal condition is detected.

9. A vehicle-mounted system according to claim 8, wherein said recording means includes at least one of a camera for producing a static image and a video camera for producing a continuous image.

10. A vehicle-mounted system according to claim 9, further comprising a display screen, on which the image recorded by said recording means can be displayed.

11. A vehicle-mounted system, comprising;

a security device for detecting an abnormal condition for a vehicle in an arming mode, said security device including means for recording an image of the interior of the vehicle when an abnormal condition is detected;

a display screen on which the image recorded by said recording means can be displayed;

an emergency communication service unit, including at least one switch operated to communicate with a response center, wherein said at least one switch includes a communication switch operated when communicating by voice with said response center and a panic switch operated for communicating the occurrence of an emergency to said response center in the event of emergency; and a visual indicator in the form of a single light that is turned on when a connection to said response center is established upon operation of said at least one switch, wherein the visual indicator includes at least two visual states, with a first state being turned on when a voice connection to said response center is established upon operation of the communication switch and turned off when the connection is terminated, said first visual state being maintained for the time that the voice connection is established, and a second state being turned on when a connection to said response center is established upon operation of the panic switch;

wherein said recording means includes at least one of a camera for producing a static image and a video camera for producing a continuous image, and the display screen is a display screen of a vehicle-mounted navigation system.

12. A vehicle-mounted system according to claim 11, the security device and the emergency communication service unit being connected in communication with one another, and wherein an image recorded by said recording means can be transmitted to said response center by the emergency communication service unit.

13. A vehicle-mounted system according to claim 12, wherein said emergency communication service unit adds a user ID to the image transmitted to said response center.

14. A vehicle-mounted system according to claim 11, wherein the visual indicator is a light emitting diode (LED).

15. A vehicle-mounted system according to claim 11, wherein the first visual state is a green light and the second visual state is a red light.

16. A vehicle-mounted system comprising:

a security device for detecting an abnormal condition for a vehicle in an arming mode, said security device including means for recording an image of the interior of the vehicle when an abnormal condition is detected;

an emergency communication service unit including at least one switch operated to communicate with a response center, wherein said at least one switch includes a communication switch operated when communicating by voice with said response center and a panic switch operated for communicating the occurrence of an emergency to said response center in the event of emergency; and a visual indicator in the form of a single light that is turned on when a connection to said response center is established upon operation of said at least one switch, wherein the visual indicator includes at least two visual states, with a first state being turned on when a voice connection to said response center is established upon operation of the communication switch and turned off when the connection is terminated, said first visual state being maintained for the time that the voice connection is established, and a second state being turned on when a connection to said response center is established upon operation of the panic switch;

wherein the security device and the emergency communication service are connected in communication with one another, an image recorded by said recording means can be transmitted to said response center by the emergency communication service unit, and said recording means includes at least one of a camera for producing a static image and a video camera for producing a continuous image.

17. A vehicle-mounted system according to claim 16, wherein a user ID is transmitted to said response center by the emergency communication service unit along with said image.

18. A vehicle-mounted system according to claim 16, wherein said emergency communication service unit adds a user ID to the image transmitted to said response center.

19. A vehicle-mounted system according to claim 16, wherein the visual indicator is a light emitting diode (LED).

20. A vehicle-mounted system according to claim 16, wherein the first visual state is a green light and the second visual state is a red light.

21. A vehicle-mounted system, comprising:
a security device for detecting an abnormal condition for a vehicle in an arming mode, said security device including means for recording an image of the interior of the vehicle when an abnormal condition is detected;
a mobile telephone connected in communication with said security device, and wherein an image recorded by said recording means can be transmitted by said mobile telephone;
an emergency communication service unit, including at least one switch operated to communicate with a response center, wherein said at least one switch includes a communication switch operated when communicating by voice with said response center and a panic switch operated for communicating the occurrence of an emergency to said response center in the event of emergency; and
a visual indicator in the form of a single light that is turned on when a connection to said response center is established upon operation of said at least one switch, wherein the visual indicator includes at least two visual states, with a first state being turned on when a voice connection to said response center is established upon operation of the communication switch and turned off when the connection is terminated, said first visual state being maintained for the time that the voice connection is established, and a second state being turned on when a connection to said response center is established upon operation of the panic switch;

wherein said recording means includes at least one of a camera for producing a static image and a video camera for producing a continuous image, said mobile telephone is part of said emergency communication service unit, and the recorded image can be transmitted to said response center that is in communication with the emergency communication service unit.

22. A vehicle-mounted system according to claim 21, wherein said emergency communication service unit adds a user ID to the image transmitted to said response center.

23. A vehicle-mounted system according to claim 21, wherein the visual indicator is a light emitting diode (LED).

24. A vehicle-mounted system according to claim 21, wherein the first visual state is a green light and the second visual state is a red light.

* * * * *

UNITED STATES PATENT AND TRADEMARK OFFICE
CERTIFICATE OF CORRECTION

PATENT NO.    : 6,675,006 B1
DATED         : January 6, 2004
INVENTOR(S)   : Melvin Diaz et al.

It is certified that error appears in the above-identified patent and that said Letters Patent is hereby corrected as shown below:

Column 8,
Line 57, before "with said" insert -- by voice --.

Column 9,
Line 3, immediately after "is established" insert -- , -- (comma).
Line 15, immediately after "switch" delete ":" (colon) and substitute -- ; -- (semicolon) in its place.

Column 10,
Line 55, immediately after "system" insert -- , -- (comma).

Signed and Sealed this

Fifteenth Day of June, 2004

JON W. DUDAS
*Acting Director of the United States Patent and Trademark Office*